(No Model.)
S. M. WIER.
TWO WHEELED VEHICLE.
No. 275,307. Patented Apr. 3, 1883.
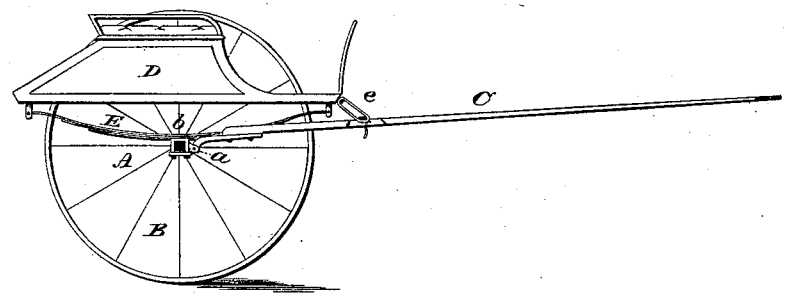

UNITED STATES PATENT OFFICE.

STEPHEN M. WIER, OF NEW HAVEN, CONNECTICUT.

TWO-WHEELED VEHICLE.

SPECIFICATION forming part of Letters Patent No. 275,307, dated April 3, 1883.

Application filed January 11, 1883. (No model.)

*To all whom it may concern:*

Be it known that I, STEPHEN M. WIER, of New Haven, in the county of New Haven and State of Connecticut, have invented a new Improvement in Two-Wheeled Vehicles; and I do hereby declare the following, when taken in connection with the accompanying drawing and the letters of reference marked thereon, to be a full, clear, and exact description of the same, and which said drawing constitutes part of this specification, and represents a sectional side view.

This invention relates to an improvement in that class of vehicles which have but a single axle and two wheels.

In the usual construction of this class of vehicles the shafts are attached directly and rigidly to the axle, so that the up-and-down movement unavoidably given to the shafts by most horses in trotting imparts to the axle a rocking movement, which is transferred to the body, to the discomfort of the occupant. In many cases, particularly in what is now known as the "village-cart," the shafts are attached directly to the body and the springs to the axle; but in this construction the same difficulty is retained. So great is this difficulty or discomfort to the rider that many persons will not use such vehicles, and which, without this difficulty, would be desirable.

The object of this invention is to construct a carriage in which this difficulty will be substantially avoided; and it consists in hinging the shafts to the axle and attaching the spring which carries the body rigidly to the axle, with a flexible connection between the body and the shafts, as more fully hereinafter described.

A represents the axle, which may be a common square axle, or of any desirable shape, and carries upon its opposite face the wheels B, in the usual manner. C, the shafts, are hinged to the axle, as at *a*, by means of any of the well-known shackles which produce a hinge-joint, so that the up-and-down movement of the shafts may be made entirely independent, or without effect upon the axle. D, the body, as here represented, is hung to a half-elliptic spring, E—one at each side—the springs attached to the body by their ends at the front and rear. At the center the spring is rigidly clipped to the axle, as at *b*, the arrangement of the body being such that when a person is in the seat the greater weight is in rear of the axle. At the forward end, or other convenient place between the axles and the forward end, a flexible connection, *e*, is made between the body and the shafts. This may be by metal links or chain; but I prefer a leather or other suitable strap, which may be extended or contracted, as occasion requires. The length of this connection should be made with relation to the height of the horse, so that when the horse is attached the body will stand substantially level.

By hinging the shafts to the axle the movement of the body of the horse in trotting, which unavoidably imparts an up-and-down vibratory movement to the shafts, is not imparted to the axle, the vibration extending only from the hinge forward, thus leaving the axle extending, as it were, to support the body. The flexible connection between the body and the shafts simply prevents any undue rocking of the body, and yields to the vibration of the shafts without imparting that vibration to the body, the vibrations being so fast that the body has not time to rock or change its relation between the vibrations, but stands substantially as firm and regular as a carriage supported upon four wheels, and all the ease of such a carriage is attained without the discomforts of the two-wheeled vehicle as heretofore constructed.

The body may hang below the axle—that is, the axle pass through the body, as in the village-cart—the shafts hinged to the axle outside the body, but the flexible connection made between the shafts and the body.

It will be understood that the spring may be of any of the various known descriptions. For illustration, it may be a single full elliptic spring arranged parallel with and upon the top of the axle, the body resting on top of that spring; or platform-springs may be employed, or any suitable spring, the essential feature of my invention being the hinging of the shafts to the axle, the rigid connection of the body to the axle, and the flexible connection between the body and the shafts.

I am aware that a sulky has been made having the shafts hinged to the axle-springs between the axle and body, and with an elastic or spring connection between the shafts and body at the forward end; but in such construction the movement of the shafts is necessarily communicated to the body through the spring, whether it be up or down, and the body can have no extent of movement without acting upon the shafts through the said forward spring, which construction occasions the difficulties hereinbefore described. I do not wish to be understood, therefore, as claiming, broadly, a sulky or two-wheeled vehicle having shafts hinged to the axle, and with springs between the body and the axle, and also between the body and the shafts at the forward end of the body, my invention being distinguished by the flexible connection between the shaft and body, which avoids the transfer of the up-and-down movement of the shafts to the body.

I claim—

The herein-described two-wheeled vehicle, consisting of the axle A, shafts C, hinged thereto, the body D, rigidly connected to the axle, and with a loose flexible connection between the shafts and body, substantially as described.

STEPHEN M. WIER.

Witnesses:
STEPHEN A. PECK,
JOS. C. EARLE.